US008229921B2

(12) United States Patent
Ramakrishnan et al.

(10) Patent No.: US 8,229,921 B2
(45) Date of Patent: *Jul. 24, 2012

(54) METHOD FOR INDEXING FOR RETRIEVING DOCUMENTS USING PARTICLES (75) Inventors: Bhiksha Ramakrishnan, Watertown, MA (US); Evandro B. Gouvêa, Cambridge, MA (US); Bent Schmidt-Nielsen, Lexington, MA (US); Garrett Weinberg, Watertown, MA (US); Bret A. Harsham, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 234 days.

This patent is subject to a terminal disclaimer.

(21) Appl. No.: 12/036,681

(22) Filed: Feb. 25, 2008

(65) Prior Publication Data
US 2009/0216740 A1    Aug. 27, 2009

(51) Int. Cl.
G06F 7/00 (2006.01)
G06F 17/00 (2006.01)
G06F 17/30 (2006.01)
G06F 9/44 (2006.01)
G06N 5/00 (2006.01)

(52) U.S. Cl. ............................ 707/715; 706/45; 717/104
(58) Field of Classification Search .................. 704/231, 704/251, 270
See application file for complete search history.

(56) References Cited

U.S. PATENT DOCUMENTS

| | | | |
|---|---|---|---|
| 6,185,527 B1* | 2/2001 | Petkovic et al. | 704/231 |
| 6,282,538 B1* | 8/2001 | Woods | 1/1 |
| 6,473,730 B1* | 10/2002 | McKeown et al. | 704/9 |
| 6,873,993 B2* | 3/2005 | Charlesworth et al. | 1/1 |
| 6,877,001 B2* | 4/2005 | Wolf et al. | 1/1 |
| 7,089,188 B2 | 8/2006 | Logan et al. | |
| 7,113,910 B1* | 9/2006 | Pereira et al. | 704/270 |
| 7,181,398 B2 | 2/2007 | Thong et al. | |
| 7,698,136 B1* | 4/2010 | Nguyen et al. | 704/241 |
| 2002/0064257 A1* | 5/2002 | Denenberg et al. | 379/88.03 |
| 2002/0173958 A1* | 11/2002 | Asano et al. | 704/251 |

OTHER PUBLICATIONS

Whittaker, E. W. D./Woodland, P.C. (2000): "Particle-based language modeling", Conference on Spoken Language Processing (ICSLP2000) Oct. 16-20, 2000 -2000, vol. 1, 170-173, Beijing, China.

Bo-Ren Bai et al. "Syllable-Based Chinese Text/Spoken Document Retrieval Using Text/Speech Queries," Dept. of Electrical Engineering Nation Taiwan University; International Journal of Pattern Recognition and Artificial Intelligence, vol. 14, No. 5 (2000).

* cited by examiner

*Primary Examiner* — Susan Chen
(74) *Attorney, Agent, or Firm* — Dirk Brinkman; Gene Vinokur (57) ABSTRACT

An information retrieval system stores and retrieves documents using particles and a particle-based language model. A set of particles for a collection of documents in a particular language is constructed from training documents such that a perplexity of the particle-based language model is substantially lower than the perplexity of a word-based language model constructed from the same training documents. The documents can then be converted to document particle graphs from which particle-based keys are extracted to form an index to the documents. Users can then retrieve relevant documents using queries also in the form of particle graphs.

21 Claims, 8 Drawing Sheets

METHOD FOR INDEXING FOR RETRIEVING DOCUMENTS USING PARTICLES

FIELD OF THE INVENTION

The invention relates generally to information retrieval, and more particularly to indexing and retrieving document in a database.

BACKGROUND OF THE INVENTION

Information retrieval systems that retrieve documents pertinent to a text query are common. Documents are typically a collection of words indexed either directly by the words in the collection, or through linear transformations of word-count vectors, often referred to as document vectors. Queries can also be represented as sets of words that are used to retrieve documents from the index, or as word-count vectors that are compared to the document vectors to identify the documents that are most relevant to the query. Relevant documents that are returned to a user are often called a result set.

The increasing availability of automatic speech recognition (ASR) systems has permitted the extension of text-based information retrieval systems to systems where either the documents or the queries are spoken.

Spoken document retrieval systems can index audio recordings of broadcast news programs, podcasts, recordings of meetings, lectures, presentations, and the like. Typically, the spoken documents are first transcribed into text, either manually or using ASR systems. The resulting words in the text are stored in an index to a database. Queries are matched to the word index, and either the textual transcription or the audio recording is returned to the user.

Spoken query systems use speech to query the document retrieval system. Once again, the query is converted to word form using the ASR system and matched to the index for retrieval.

In all of the above, the basic units used by the indexing system are words. In purely text-based systems, where both the documents and the queries are text, documents are indexed by the words in the documents, and the words in the queries are matched to those in the index. When the documents or the queries are spoken, the words are first converted to word sequences or word lattices, which are then used to construct the word index or to match the query against the word index.

Word-based indexing schemes have a basic restriction, particularly when the queries or documents are spoken. ASR systems have limited vocabularies. The vocabulary of words that the systems can recognize must first be specified. This also means that the vocabulary of the recognizer must be updated whenever a document that includes a word that is not currently in the recognizer's vocabulary is added to the index.

In the case of spoken documents, this presents a problem because the vocabulary of a new document cannot be completely known a priori. For spoken queries, this would imply that the system that is used to input the query must be updated whenever the document index is updated. This is an unrealistic requirement in many applications. Even when both the documents and the queries are purely text-based, word-based indexing faces the problem of misspelling. Words in the query are often spelt differently by users than in documents, particularly when the words are novel or complicated. Clearly, retrieval is adversely affected when words spellings in the documents and the queries do not match.

Document retrieval systems usually return one or more documents from a database that are deemed to be relevant to the words in a query by a user. The interpretation of the term "document" can be quite general. For instance, retrieval of documents from the web, as well as retrieval of files from a personal computer, or retrieval of music from a collection of songs described by metadata can all be regarded as instances of 'document' retrieval.

Obviously, not all the information in documents lends itself well to a tree structured dialog that can be traversed by menus. The information has to be retrieved using techniques that are commonly referred to as "information retrieval," (IR) that do not depend on the structure of the information in the document.

Documents can not always be text-based. Documents can also include recordings of spoken data, such as broadcast news programs, seminars and lectures, public addresses, meetings, etc. Similarly the queries that are used to retrieve documents from a database need not necessarily be textual. The queries can also be spoken.

Text-Based Retrieval

Figure 1:
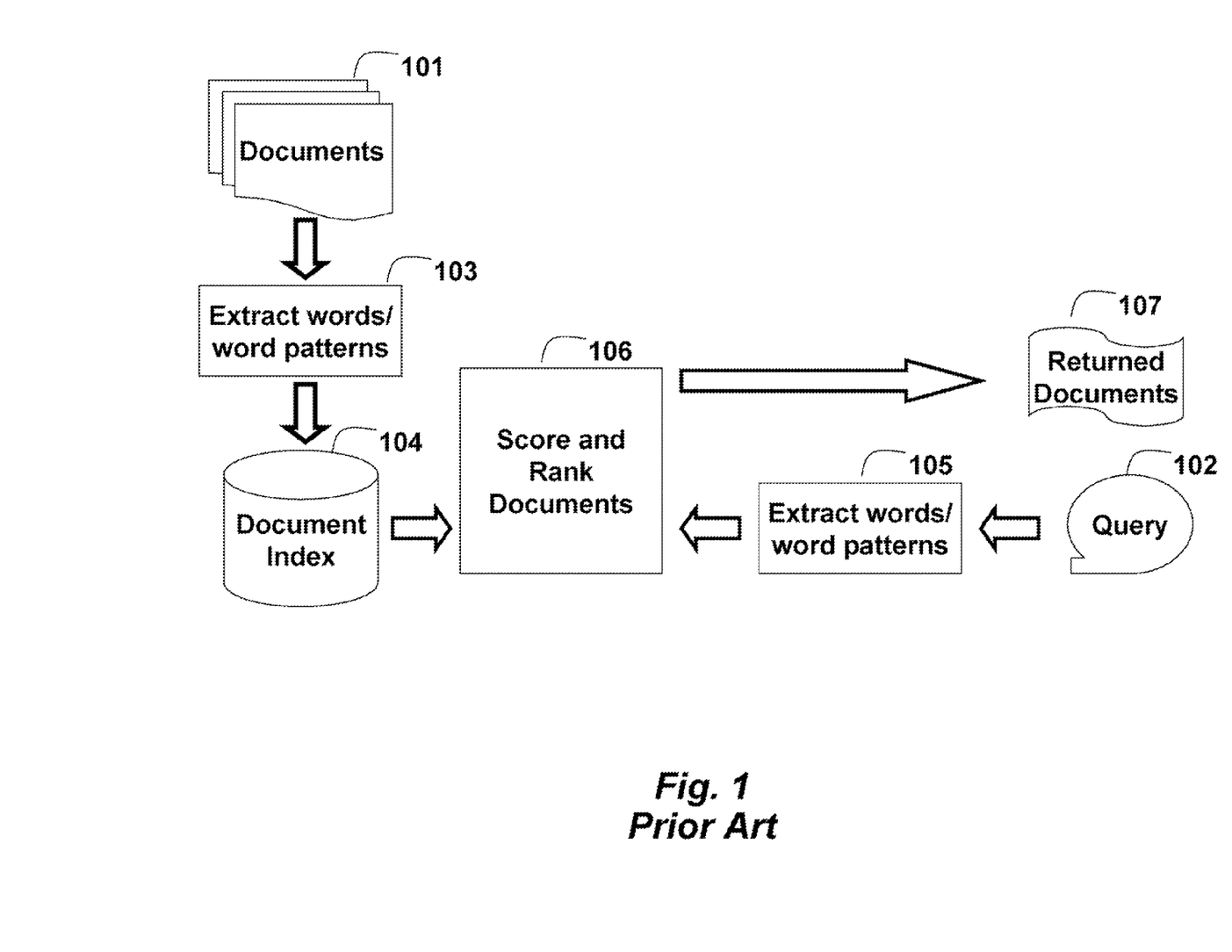
FIG. 1 is a block diagram of a conventional document retrieval system that uses text queries.

FIG. 1 shows a conventional text-based systems, documents 101 and queries 102 are both in text form. The set of words or word patterns extracted 103 from all documents is used to construct a document index 104. Words or word patterns are also extracted 105 from the query. The index either has each word pointing to every document in which the word appears, or the index has a word count vector for each document. The word count vector has the number of times each word occurs in the document.

The queries are then processed in a manner consistent with the structure of the index, and a result set of documents 107 is scored and ranked 106, and returned to the user.

Spoken Document Retrieval

Figure 2:
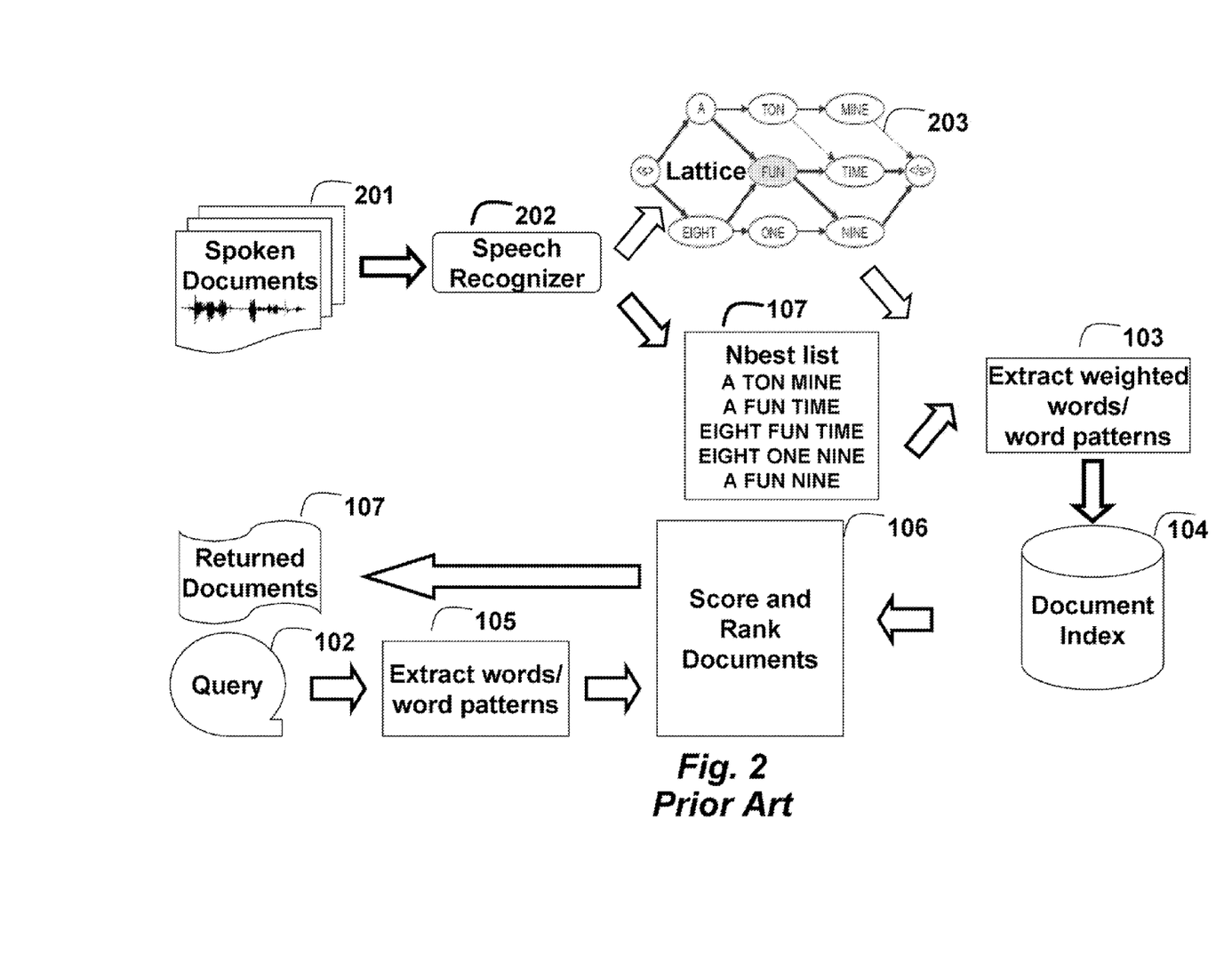
FIGS. 2-3 are block diagrams of a conventional document retrieval system that uses spoken queries.

As shown in FIG. 2, spoken documents 201 include audio recordings of speech, such described above. The speech is recognized 202. It is sometimes desired to index and retrieve such documents in response to the queries 102.

The conventional approach to retrieval of spoken documents has been to convert the documents to sequences of words using the ASR system. The converted documents are then indexed and retrieved in the same manner as text documents.

It is well known that ASR systems are inaccurate by nature. The recognized words for any document can therefore contain several errors that will result in retrieval of incorrect documents in response to a query. To account for this, documents are often represented in terms of the word lattice that is considered by the recognizer when decoding the documents. Alternately, the documents can be represented by the n-best list, i.e., the top N recognition hypotheses that the recognizer generated for the document. The document is then indexed by words (or word-count vectors) derived from the word lattice, or the n-best lists. The rest of the indexing and retrieval processes are the same as for text documents.

Figure 3:
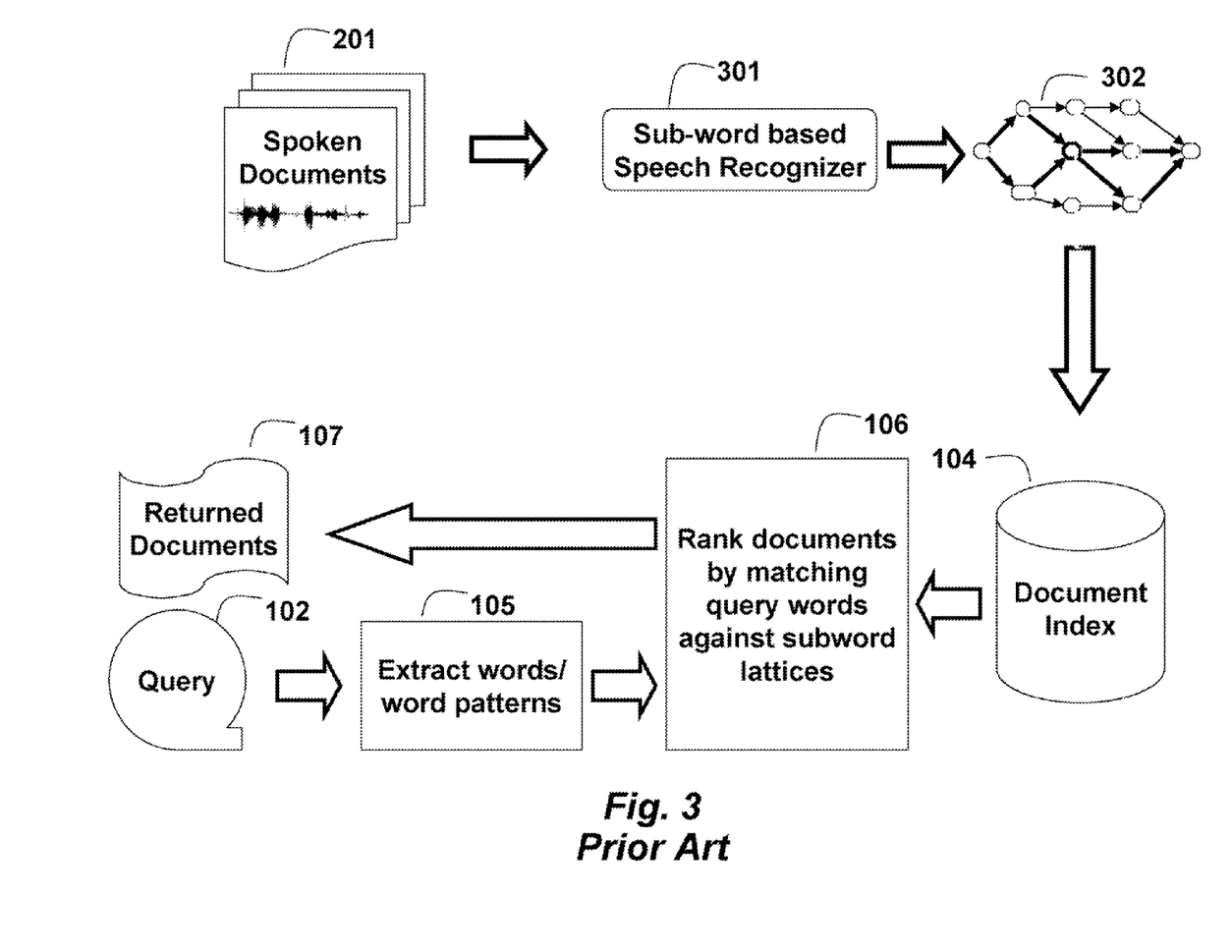

As shown in FIG. 3, an alternative approach converts 301 the spoken documents into sequences or lattices 302 of phonemes, or syllables of the words. Documents are represented in their entirety in terms of these lattices. Words in the query are then matched to the sequences or lattices in the documents to identify candidate documents that contain sequences that can match the words in the query.

Retrieval from Spoken Queries

It is not always convenient to type text in queries, e.g., when using small handheld devices, or while driving a vehicle or operating a machine. Text entry may be inconvenient, or even impossible. In such situations, users can speak their queries. Spoken query systems attempt to retrieve documents using the words in the spoken queries.

As in the case of spoken document retrieval, spoken queries are first converted to words by the ASR system. Once again, the documents can be converted to a linear sequence or a lattice of words. The words in the test form of the query are used to retrieve documents from the index, e.g., see U.S. Pat. No. 6,877,001 issued to Wolf, et al., Apr. 5, 2005, "Method and system for retrieving documents with spoken queries." incorporated herein by reference.

Other systems can combine both textual and spoken documents in their index, and permit both spoken and text-based queries. In all cases, the basic unit that is used to match documents to queries is the word.

Drawbacks of Word-Based Matching

Retrieval of text documents using text queries is probably the most reliable of all forms of document retrieval. Nevertheless, it has its restrictions. The key words in documents that distinguish the documents from, others are often novel words, with unusual spelling. Users who attempt to retrieve these documents will frequently be unsure of the precise spelling of these terms and misspell the words. Any word-based mechanism for retrieval will not be able to match the misspelled words to the corresponding documents. To counter this, many word based systems use various spelling-correction mechanisms that alert the user to potential misspelling, but even these will not suffice when the user is basically unsure of the spelling.

Spoken documents must first be converted to words using the ASR system. ASR systems have limited vocabularies, even if they are very large. Even extremely large vocabulary systems typically include the most commonly used tens of thousands of words, or, in extreme cases, hundreds of thousands of words, in their recognition vocabulary. This immediately gives rise to several problems. Firstly, the key distinguishing terms in any document are, by nature, unusual, or they would not distinguish the document from others. As a result, these very words are the least likely to actually be present in the recognizer's vocabulary, and are thus unlikely to be recognized. To counter this, the key words in the documents must be dynamically added to the recognizer's vocabulary prior to recognition. A natural problem arises here. In a novel document, the key words to be found can not be known a priori.

Secondly, ASR systems are statistical machines that are biased a priori to recognize frequent words more accurately than rare words. As a result, even when the key words in any document have actually been included in the ASR system's vocabulary, the key words are highly likely to be misrecognized, thereby voiding the rationale for including them in the system's vocabulary. As a compensating factor, key words in documents are typically repeated multiple times in the spoken document, and the probability that the recognizer will miss all instances of the word is considerably lower than that the recognizer will miss any single instance. Thus, spoken document retrieval systems are able to function reasonably, even when the accuracy of the recognizer is relatively low.

Even when the spoken documents are actually transcribed into lattices in order to reduce the effect of out-of-vocabulary terms, queries are nevertheless whole words that must be matched to the document, and will suffer from the misspelling problem described above. More important, this will require each word in the query to be matched against the entire particle lattice for each document in order to score the documents, making the entire process extremely inefficient.

Spoken query systems are, perhaps, the least reliable of all document retrieval systems. Queries are usually converted to sequences or lattices of words by the ASR system as described above. Queries are typically short. Clearly, the cost of a single misrecognition is extremely high.

To be recognized, the key words that the user expects to find in the document must be included in the recognizer's vocabulary. This means that as documents are added to the index, the key words in the documents must first be included in the vocabulary of the recognizer that processes the queries. This can be particularly burdensome on systems where the query is initially processed by a remote client. Each update to the index must promptly be communicated to every client that aims to use the index. This operation can become very time consuming Even if the query processing is performed on servers that are collocated with the index, time restrictions are a problem. Users require the response to a query to be prompt. The speed with which the ASR system operates depends on the vocabulary, and each update of the document index that results in an increase of the recognition vocabulary will slow down the ASR system and increase the latency of the retrieval. The amount of memory used by the ASR system will also increase non-linearly with increasing vocabulary, restricting the number of queries that can be processed concurrently.

SUMMARY OF THE INVENTION

Conventional information retrieval mechanisms represent documents in terms of words or word combinations. This holds true whether the documents or queries are spoken or written. Indexing by word combinations results in several restrictions, arising from uncertainties or errors in spelling or recognition. These restrictions are of course more severe when the queries or documents are spoken and must be recognized prior to indexing, since the automatic speech recognition (ASR) system imposes further vocabulary limitations.

The embodiments of the invention provide a document indexing and retrieval systems that represents documents in terms of particles units for retrieval with spoken queries. By an appropriate selection of particles, vocabulary limitations of the system are avoided. Additionally, such a system can operate with much smaller language models, with much smaller memory and CPU requirements than conventional word-based information retrieval systems required by word-based indexing systems.

DETAILED DESCRIPTION OF THE PREFERRED EMBODIMENTS

Particle-Base Document Indexing

The embodiments of our invention provide a method for indexing documents and retrieving the documents based on particles, and not words as in the prior art.

Particles themselves are not new, see Whittaker, E. W. D., Woodland, P. C., "Particle-based language modelling", International Conference on Speech and Language Processing (ICSLP), 2000. U.S. Pat. No. 7,089,188, "Method to expand inputs for word or document searching," issued to Logan et al. on Aug. 8, 2006, and U.S. Pat. No. 7,181,398, "Vocabulary independent speech recognition system and method using subword units," issued to Thong, et al. on Feb. 20, 2007, However, there the particles are used to recognize words, and it is words that are indexed and searched during document retrieval.

Particle indexing and retrieval is based on our observation that the pronunciations of words can be described by a sequence of one or more sound units such as phonemes or syllables. Consequently, any spoken utterance can be viewed fundamentally as a sequence of these sound units. Words are merely groupings of these sound units that have been deemed to carry some semantic relationship. However, the sound units in an utterance can be grouped sequentially in any other manner than those specified by words.

This is shown in Table 1.

TABLE 1

| The big dog | dh iy . b ih g . d aa g | /dh iy/ /dh iy b/ /dh/ | /b ih g/ /ih g d/ /iy b ih/ | /d aa g/ /aa g/ /g d/ | /aa g/ |
|---|---|---|---|---|---|

Table 1 shows different ways of representing the word sequence "the big dog" (in the first column) as particles in the four right-most columns. The second column represents the phonetic pronunciation for the words in the utterance. Periods in this column separate words.

If we assume that an utterance is characterized by the entire sequence of sounds in the utterance, rather than any particular sequential grouping of the sounds, all of the particle decompositions in Table 1 are valid characterizations of the utterance.

The goal of particle-based representations, then, is to come up with alternate sequential groupings of sounds that can represent the sound sequences, both putative and actual, that occur in a collection of documents.

We refer to each of these groupings as a particle. For instance, in the example of Table 1, each of the sound sequences bracketed by the slashes (/), e.g., /dh iy/, /dh iy b/ and /dh/, are all particles. Note that some particles in this table actually traverse word boundaries, which is unconventional. Whether such particles are accepted depends on the manner in which the specific set of particles selected to represent the language in the documents and queries is designed.

Particles

Although particles can be constructed in many ways as described above, not all possible particles can be used for particle-based indexing. The actual set of particles that are used to represent queries and documents for retrieval is selected carefully.

We impose the following requirements on the set of particles,
1. The particles must represent all possible sound sequences that occur in any query, or can be derived from the pronunciation of any sequence of words from the document.
2. The particles must make it possible to identify key particles in any document that distinguish this document from others.

The requirement for condition 1 is self evident. In order to adequately represent any document or query, it must be possible to express the documents completely in terms of the particles. If any sentence or utterance cannot be decomposed perfectly into a sequence of particles, it cannot be used effectively either as a key entry to an index or as a key in a query.

However, we can relax the first condition slightly to state that "particles must represent most sound sequences" in any query or document, with the understanding that while unrepresented portions of the documents (or queries) are not usable, if the number of particles is small enough, then it does not to affect overall performance of the system.

Condition 2 arises from the fact that the goal of the system is information retrieval. In order to correctly retrieve documents that are pertinent to a query, it is necessary to be able to identify patterns in the query that are more frequent in relevant documents than in others.

In conventional word-based representation of documents and queries, the words in the query themselves represent the unique patterns that the user expects to find in the relevant documents.

When the documents and queries are represented in terms of particles, it is similarly necessary that the particles (or particle patterns) in the query occur more frequently in relevant documents than in others.

For example, the set of phonemes in the language(s) of the documents satisfies condition 1 and can be used to represent any query or document. However, the relative frequency of occurrence of phonemes does not vary greatly over a collection of documents, particularly if the collection is large, e.g., the millions and millions of documents on web, and represents the phonetic characteristic of the language rather than specific document characteristics. For example, the number of phonemes in most common languages is quite small, e.g., about 50. As a result, any attempt at retrieval from a phoneme-based representation of a query is likely to return a large number of documents that contain the phonemes in the query but are not semantically related to the query in any manner. Clearly, a very small set of phonemes is not a good particle set for IR. Thus, use of particles in retrieval systems is advantageous as compared to use of words for the following reasons.

Text Normalization and Spelling

Word-based retrieval schemes are critically dependent on proper spelling of both the words in the documents and the query. Particle-based indexing mechanisms match particles sequences in dictionaries, and automatic spelling-to-pronunciation mechanisms can be used. Both pronunciation dictionaries and spelling-to-pronunciation systems provide pronunciations (and thereby particlizations) of misspelled or differently spelled instances of words that are very similar, if not identical, those of the actual words, thereby normalizing out the effect of spelling errors or variations.

Vocabulary Size

For document retrieval systems that deal with either spoken documents or spoke queries, a speech recognizer must be employed to convert the spoken audio to text form. For word-based systems a word-level recognizer converts the audio signal to word sequences or graphs. The performance of a word-based recognizer is critically dependent on the vocabulary of the recognizer, i.e., the total number of unique words the recognizer must be capable of recognizing, which in turn is related to the total number of unique words in the document set. As the number of documents increases, this number will inevitably increase and so, consequently, will the vocabulary of the recognizer. The increasing vocabulary reduces the accuracy of the recognizer, and thereby the accuracy of the information retrieval at large. A typical word based recognizer can store from 50,000 to 100,000 words.

In particle-based systems, however, this problem is greatly, if not completely alleviated because the recognizer now only recognizes particles, and the size of the set of particles, e.g., 50, is much smaller than the word-level vocabulary, e.g., 50,000 to 100,000. The ideal particle set must be such that the distribution of the particles is distinctive for a document Out-of-Vocabulary Words Words that are not in the recognizer's vocabulary will not be recognized, and hence cannot be used to index or retrieve documents. To avoid this problem, the recognizer's vocabulary must be updated whenever a new document is added to the index. This can become a particularly tedious problem for spoken queries, where the information retrieving client must be updated each time the index is updated. This problem is largely reduced for particle-based systems since novel words can usually be decomposed into the existing set of particles in the recognizer. This is best illustrated by an extreme example, where particles are phonemes. Any new word can be expressed as a sequence of phonemes, based on its pronunciation as determined from a dictionary or a spelling-to-pronunciation generator. More generically, novel words can similarly be expressed in terms of the particle set of the recognizer provided the latter is selected appropriately.

In addition to the above requirements, we need additional conditions when either the documents or the queries are spoken, because particles must be easily recognizable by the ASR system for effective performance. This leads to the following requirements:

3. the set of particles must be relatively small;
4. the particles should ideally be acoustically distinct: and self-contained units; and
5. the predictability of the occurrence of particles is relatively high.

Condition 3 relates to the speed, accuracy and size of the recognizer. A smaller set of particles results in a smaller recognition vocabulary for the recognizer, and correspondingly smaller grammars and language models that only need to employ the smaller particle vocabulary. Counterbalancing this is the fact that smaller particle sets will typically comprise acoustically shorter particles that can not be effective at discriminating documents. Also, acoustically smaller units have fewer acoustic cues and are more difficult to recognize. For example, the number of particles is about 2000.

Condition 4 above is essential for the particles to be recognizable. To be recognizable, a particle must not only have distinctive acoustic structure that distinguish them from other particles, but must also exhibit relatively low variability between different instances of the same particle. In this sense, words are good acoustic units because they tend to have several acoustic cues and be self contained. Other similarly acoustically distinct units are syllables which not only have distinctive acoustic structure but are also enunciated such that variations due to coarticulation are lower at syllable boundaries resulting in reduced variation in their expression. However syllables have fewer acoustic cues than words. Other similar particle sets can also be devised. The ideal particle set would not only satisfy condition 4, but other conditions as well.

Condition 5 relates to the linguistic predictability of particles. One possible measure of predictability is the perplexity. In statistical terms, the perplexity of a particle-based language model is substantially lower, e.g., at least ten times lower, than the perplexity of a word-based language model constructed from the same training text. As known in the art, the perplexity is a measure of the size of the set of words from which a next word is selected given the observed the history of words. We extend perplexity to particles and particle-based language models. We impose this requirement because the accuracy of speech recognition systems decreases with increasing language perplexity.

Constructing a Particle Set

Particle sets can be constructed manually, or heuristically. In languages such as Japanese, which has a limited number of syllables, the set of all syllables in the language form a natural particle set. In other languages such as English, the particle set can be harder to construct.

In one embodiment of the invention, the particle set is constructed heuristically through analysis of training documents and a simultaneously optimized language model. The training documents can include text documents and spoken documents. Although we do not specify the actual method used to construct the particle set, we do describe the general guidelines.

One method for the automatic construction of particle sets can use an objective function that codifies all the requirements specified in the previous section;

1. the particle set size;
2. the error in representing all documents and queries in a given training set;
3. the retrieval accuracy using the particle set;
4. the entropy of the statistical models that represent the particles; and
5. the perplexity of the particle-based language model derived from all documents and queries in a training corpus that can be included in the objective function.

Particle sets can be derived by incorporating only some of these conditions within the objective function. For instance, any entropy, perplexity or likelihood based criteria that is embedded within the objective function can lead to efficient Expectation Maximization (EM) based methods.

Particle-Based Information Retrieval (IR)

The primary idea of our invention is that particle-based information retrieval schemes are more likely to be robust to spelling, pronunciation and other similar errors than word-based schemes. Thus, particle-based IR schemes are applicable to all scenarios, i.e., text based retrieval of text documents, text based retrieval of spoken documents, spoken query based retrieval of text or spoken documents and all other such combinations. In the most generic case, documents can be either spoken or text. Queries can similarly be either spoken or input as text. Below we briefly describe how each of these cases can be handled.

Text Documents

Figure 4:
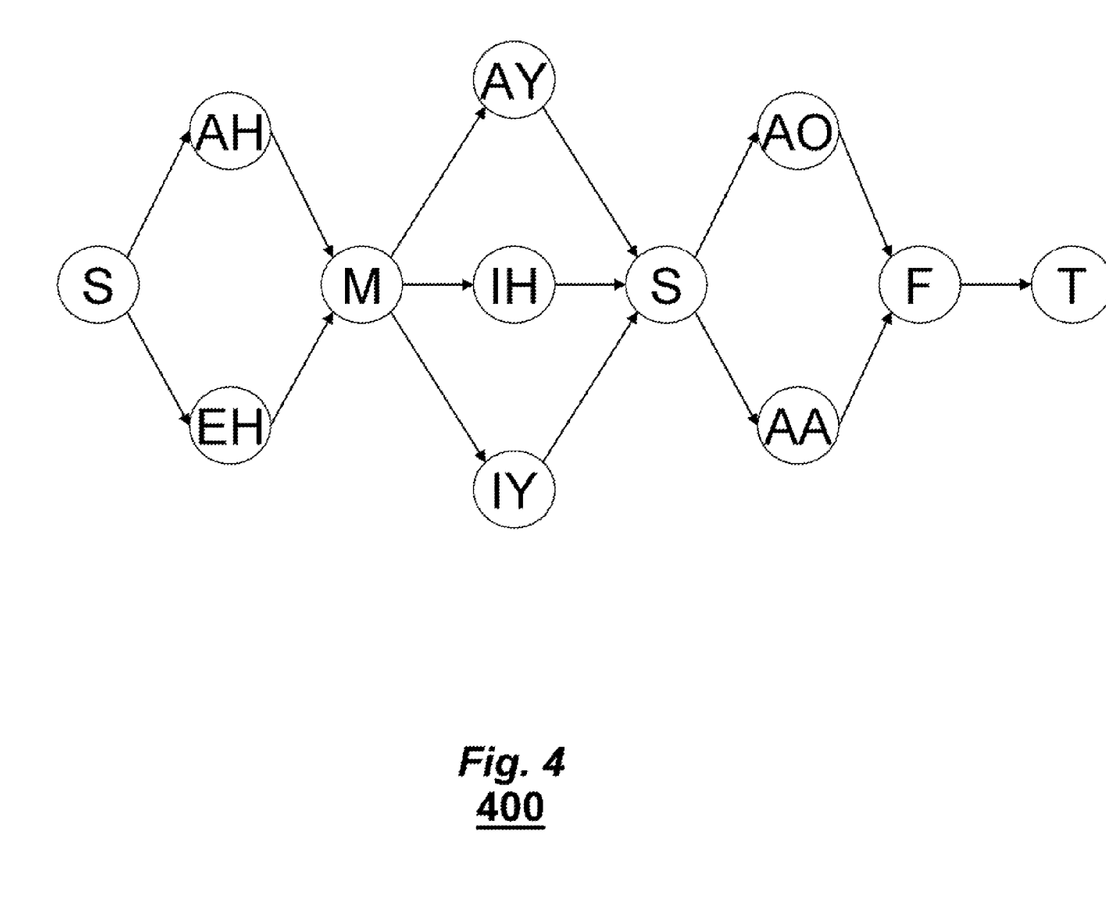
FIG. 4 is a phonetic graph according to an embodiment of the invention.

Text documents comprise sequences of words. The text in the documents is first converted to a particle-based representation. In order to do so we first convert every word, e.g., "semi soft," to a phonetic graph 400 that represent all the possible pronunciations of the word as shown in FIG. 4. The graph can also be linear in cases where there is only one possible way of pronouncing a word.

By our definition, particles can be short or long sequences of phonemes such as those shown in the four right-most columns of Table 1.

The pronunciation of a sequence of words can be grouped into sequences of particles as shown in Table 1. However, for any given particle set, there can be multiple ways of grouping the pronunciation into sequences of particles. For instance, if our particle set includes the particles "/dh iy/", "/b ih g/", "/d aa g/", "/dh iy b/", and "/ih g/", then the word sequence "the big dog" can be represented either as "/dh iy/ /b ih g/ /d aa g/", or "/dh iy b/ /ih g/ /d aa g/". These alternate decompositions can be represented as the document particle graph 500 of FIG. 5.

Particle-Based Information Retrieval System

Figure 6A:
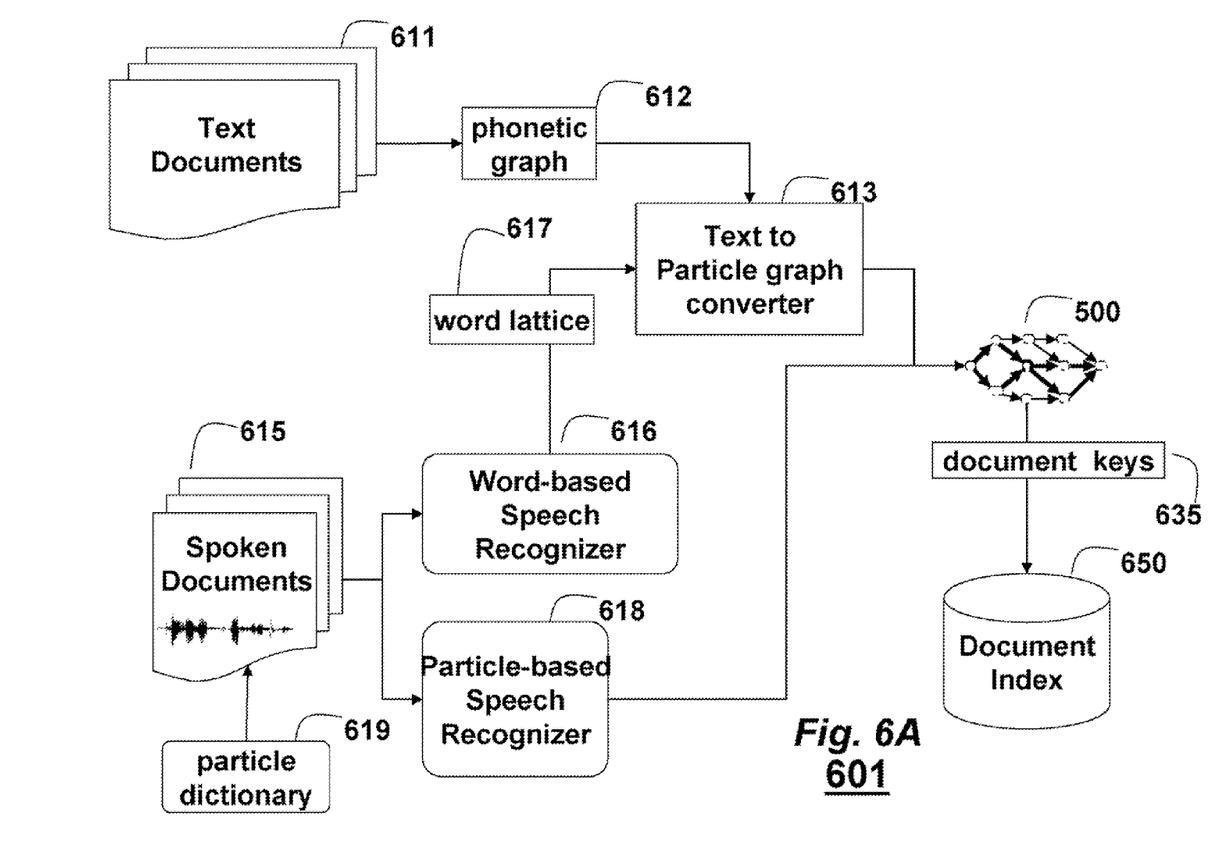
FIG. 6A is a block diagram of a document particlizer according to an embodiment of the invention.
Figure 6B:
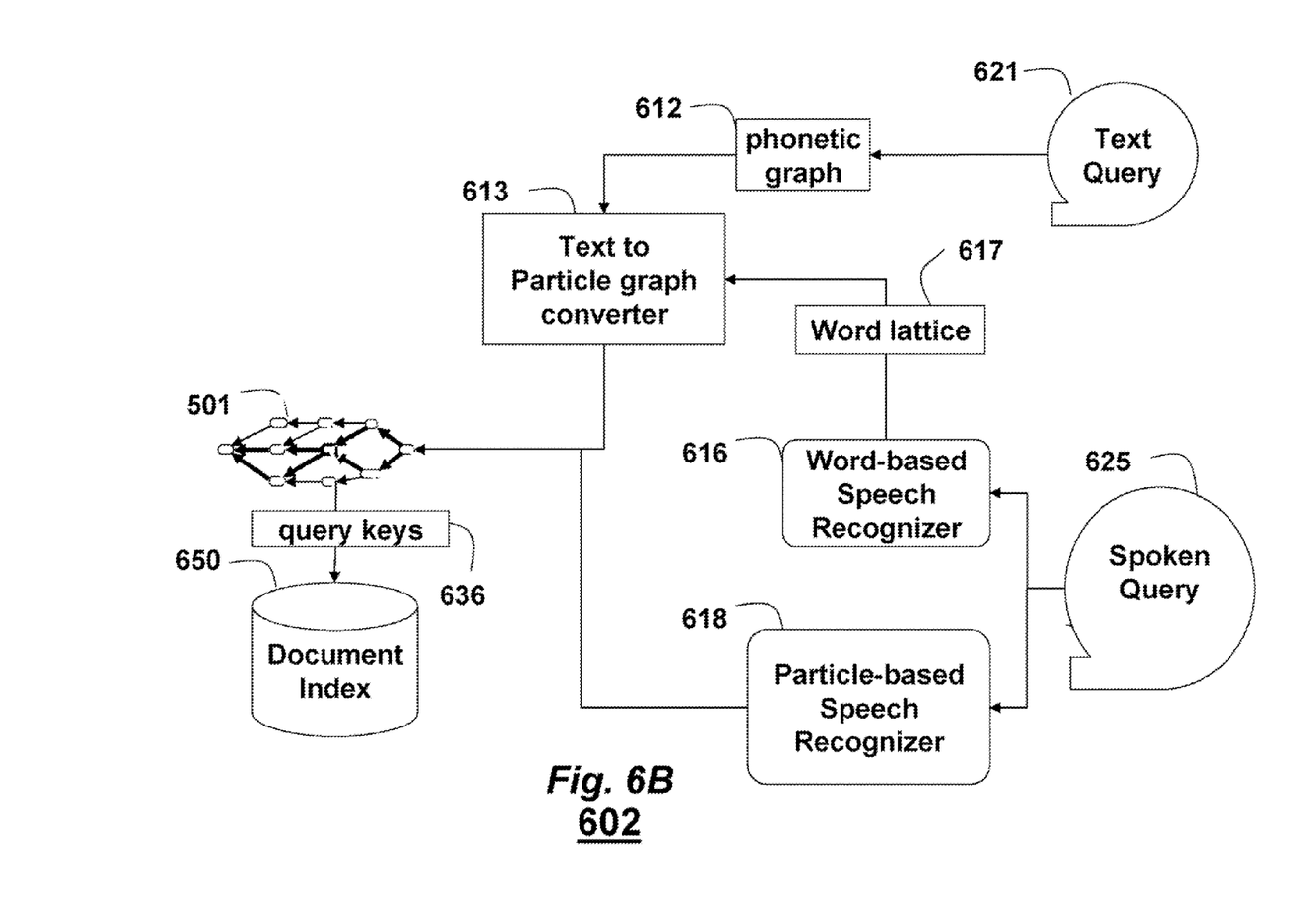
FIG. 6B is a block diagram of a query particlizer according to an embodiment of the invention.
Figure 6C:
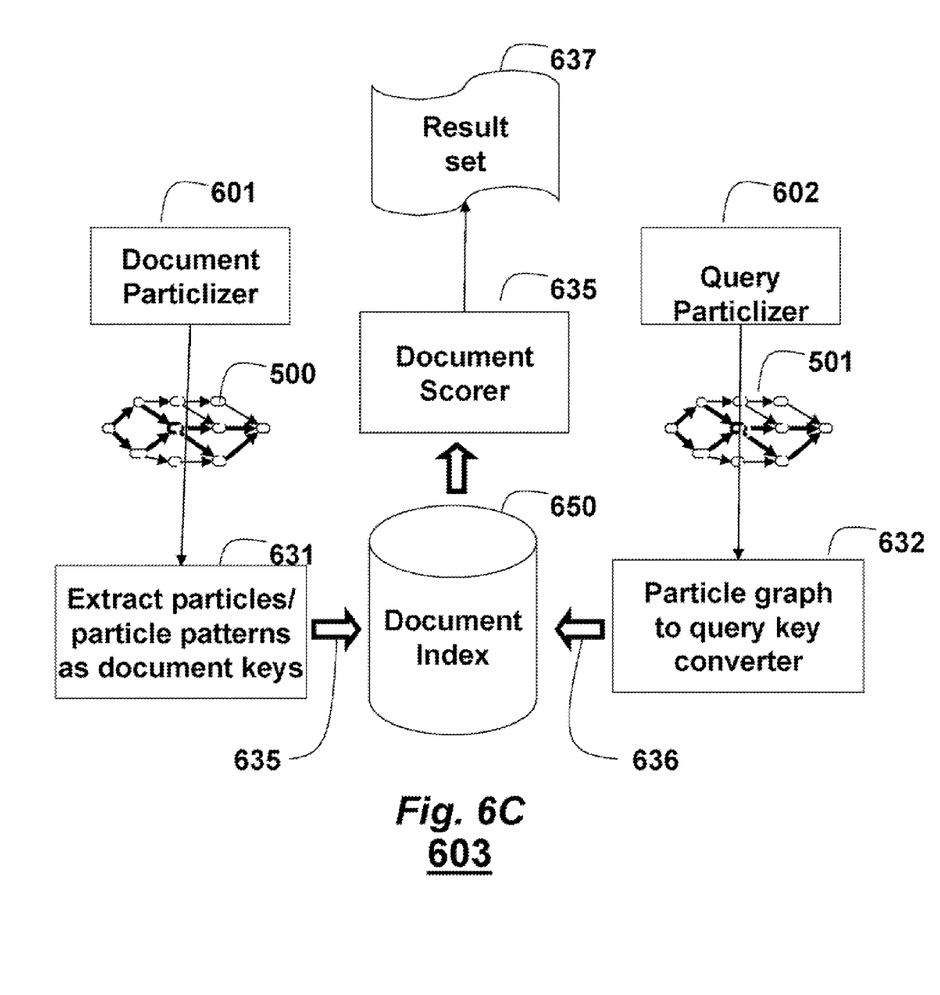
FIG. 6C is a block diagram of a particle-based information retrieval system according to an embodiment of the invention.

FIGS. 6A-6C shows the structure of the particle-based information retrieval system according to an embodiment of the invention. FIG. 6A shows the document particlizer 601. FIG. 6B shows the query particlizer 602. FIG. 6C shows the indexing of documents and retrieving documents using particles.

Document Particlizer

Text Documents

FIG. 6A shows our document particlizer 601. Text documents are converted to the particle graph 500. The text is first converted to a phonetic graph 612 by deriving the pronunciation of each word in the text, either from a pronunciation dictionary or from a phoneme-to-grapheme converter. Additional optional input can include rules that impose various restrictions, such as restrictions on particles that traverse word boundaries, and error minimization criteria in situations where the particle set is incomplete, i.e., some words sequences cannot be decomposed perfectly into particle graphs.

Figure 5:
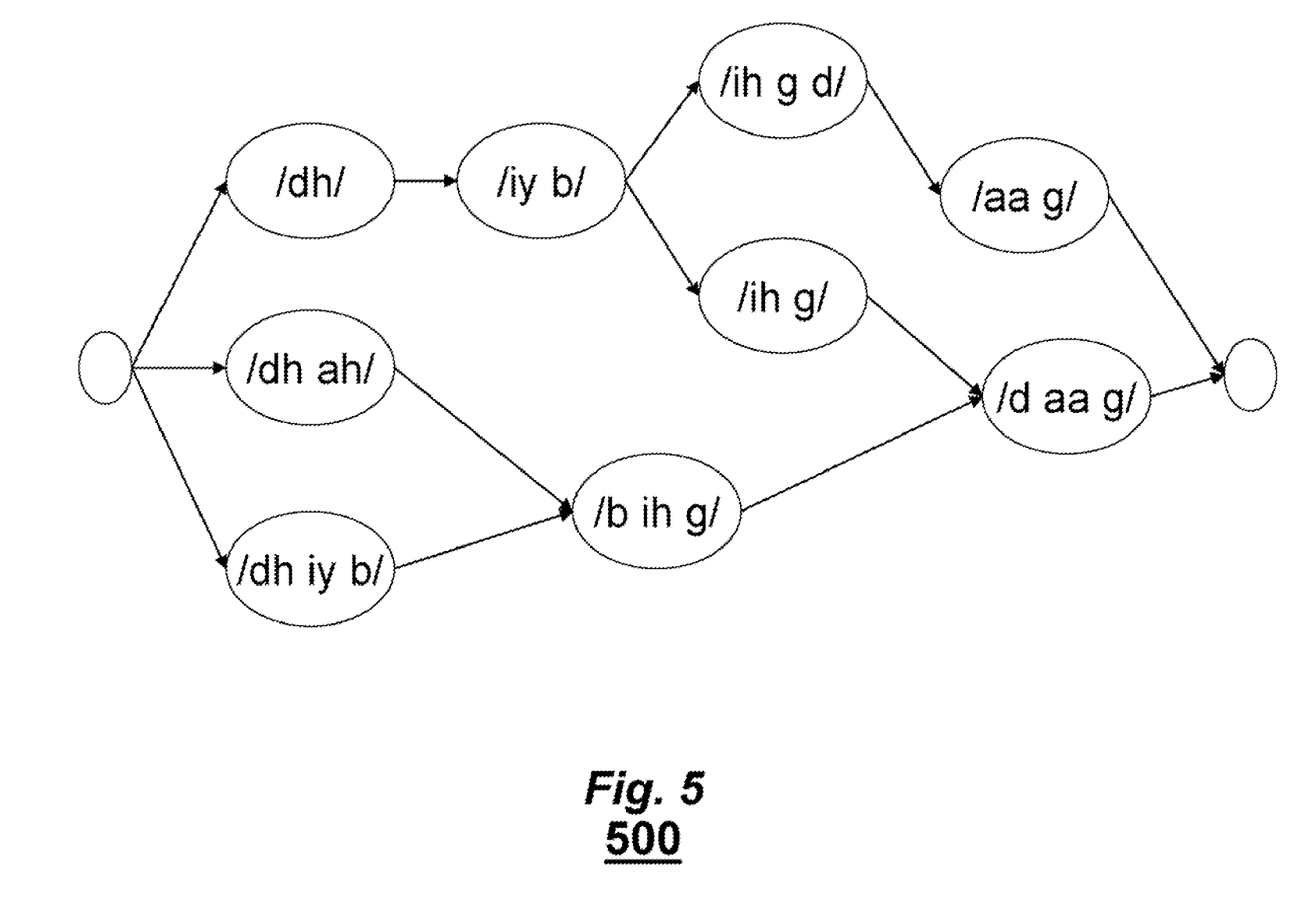
FIG. 5 is a block diagram of particle graph according to an embodiment of the invention.

Then, the phonetic graph is used to generate 613 the particle graph 500. We call this process document particlization. The document particle graph 500 can be linear, i.e., just a single sequence of particles, or a lattice as shown in FIG. 5.

Unlike conventional graphs, the particles can traverse word boundaries. Alternately, individual words in the document are particlized separately. A set of documents keys 635 is extracted from the document particle graphs. The set can include one or more keys. The document keys are stored in a document index 650. The index can use selected particles in the graph directly as keys to refer to documents, or the index can use particle sequences. We call the particle sequences particle n-grams. Alternately, other statistics, such as particle-count vectors or distributions, e.g., normalized histograms, of particles can be used to represent the document.

Spoken Documents

Spoken documents 615 contain audio signals, e.g., speech. The spoken documents are also converted to the document particle graph 500 and then document keys are inserted into the index 650, similarly to text documents. As an additional feature, the indices for spoken documents can include time stamps that indicate when in the document various particle patterns occur. Recall, text is spatial while speech is temporally evolving, hence a time-based index is appropriate.

The spoken documents 615 are converted to the particle graphs by using a speech recognizer 616. There are multiple ways in which the conversion can be performed. In the first option, a conventional word-based speech recognition system converts the audio signals to either a sequence or a word lattice 617. The word lattice is then converted 613 to the particle graph as described for the text documents.

Alternatively, the spoken documents 615 are converted directly to the particle graph using a particle-based speech recognizer 618. The particle recognizer accesses a "particle" dictionary 619 that maps particles to their pronunciations. Corresponding grammars or statistical language models specify various valid particle sequences and their probabilities. The particle recognizer outputs the particle graph 500, and the set of keys extracted from the particle graph is stored and used to index the document.

In the case of spoken documents, we can also derive weights for the particles or words output by the speech recognizers. The weights represent the confidence in the actual presence of the hypothesized word or particle in the spoken data, or the posterior probability that the term, i.e., word or particle, occurs in the document. In either case, these weights can also be factored into the keys used to represent documents. Thus, particles, particle n-grams, or particle histograms can all be augmented in various ways by these weights.

Query Particlizer

Text Queries

As shown in FIG. 6B, text queries 621 are also converted to query particle graphs 501 as described above. The words in the text query are converted to phonetic graphs 612, either using the pronunciation dictionary or the grapheme-to-phoneme converter. The particle graph is then derived from the pronunciation graph. Particles, particle n-grams, particle count vectors or particle occurrence histograms can also be derived from the particle graphs as query keys 636 to retrieve documents from the documents.

Spoken Queries

Spoken queries 625 are converted to query particle graphs 501 using any of the speech recognizers 616 and 618. As in the case of spoken documents, queries can be converted either by first converting them to word strings or lattices using a word-based speech recognizer, and converting the word graphs further to phonetic graphs analogously to the treatment of text queries, or by deriving particle graphs directly using a particle-based recognizer. As in the case of text queries, particles, particle n-grams, particle count vectors or particle occurrence histograms can be derived from the particle graphs as query keys 636 to retrieve documents using the document index. Once again, confidences, posterior probabilities, or other weights derived from the recognizer can be used to weight terms in the query prior to formation of the keys.

Particle-Based Document Index

FIG. 6C shows the particle based IR system 603 in its entirety. The particle-based document index 650 is a database that stores documents, or pointers to the documents. Typically, the database is in the form of memories, e.g., disks, tapes, RAM, ROM, and the like. The database can be centralized or widely distributed as the web of the Internet.

Documents in the database can be indexed through various mechanisms, such as the particles, particle n-grams, or particle-frequency or particle-probability histograms. The index is generated by extracting 631 particles or particle patterns from the particle graphs 500 as document keys.

The particle graph obtained from the query is converted 632 to a set (one or more) of query keys 636 for the document index 650.

Particle-Graph to Query Converter

This module converts the particle graph derived from the query into the set of keys 636 that can be used to retrieve documents from the index 650. Keys can be the particles in the graph themselves, particle n-grams, particle-count vectors or particle-frequency histograms. Where appropriate, weights determined by the speech recognizer can be used to augment these keys.

Document Scorer

The document scorer 650 determines relevance scores of documents indexed by the keys 636 of the query. Relevance scores can be determined as a distance (difference) between particle-count vectors or particle-frequency histograms determined from the query, to those determined from the documents.

Various distance measures are known, such as the Kullbaek-Leibler distance, the cosine distance. Alternately, relevance can be determined in terms of the total number of matches of particles or particle n-grams derived from the query to the document. Documents in a result set 637 are returned to a user in a decreasing order of relevance,

EFFECT OF THE INVENTION

The invention provides a novel method for retrieving information. Documents and queries can either be text or speech. Instead of using a word-based representations, as in the prior art, we decompose both the documents and queries into atomic units that are smaller than words, which we refer to as particles. These atomic particles are typically, although not necessarily, phonetically defined, where each particle represents a contiguous sequence of sounds. Documents, whether spoken or text, are converted into sequences of these particles. Indexing is in terms of the particles. Queries, in turn, are also converted into sequences of particles, which are then used to retrieve documents from the index.

Although the invention has been described by way of examples of preferred embodiments, it is to be understood that, various other adaptations and modifications can be made within the spirit and scope of the invention. Therefore, it is the object of the appended claims to cover all such variations and modifications as come within the true spirit and scope of the invention.

We claim:

1. A computer implemented method for indexing and retrieving documents in a database, comprising the steps of:
    constructing a set of particles and a simultaneously optimized particle-based language model using training documents, and in which a perplexity of the particle-based language model is at least ten times lower than the perplexity of a word-based language model constructed from the same training documents, wherein the set of particles applies expectation maximization to an objective function, and where the objective function considers any combination of:
    a size of the set of particles;
    errors in representing all documents in a document training set and a query training set;
    a retrieval accuracy of using the set of particles;
    an entropy of a statistical models that represent the set of particles; and
    a particle-level language model derived from the documents and the queries in the training sets;
    converting each document in a collection of documents to a document particle graph, the document particle graph including particles selected from the set of the particles;
    extracting, for each document, a set of document keys from the corresponding particle graph;
    storing the document keys for each document in an index to a database storing the collection of documents;
    converting a query to a query particle graph including a set of query particles, the query graph including particles selected from the set of the particles;
    extracting a set of query keys from the query particle graph;
    retrieving relevant documents from the database according to the query keys and the document keys stored in the index; and
    outputting the relevant documents to a user.

2. The method of claim 1, in which the set of particles is substantially larger than a number of phonemes in a language of the documents, and substantially smaller than a number of words in the language.

3. The method of claim 1, in which a particular particle traverses word boundaries.

4. The method of claim 1, in which the document and the query are a form of text words.

5. The method of claim 1, in which the document is in a form of text words, and the query is in a form of spoken words.

6. The method of claim 1, in which the document and the query are a form of spoken words.

7. The method of claim 1, in which the document is in a form of spoken words, and the query is in a form of text words.

8. The method of claim 1, in which the query is spoken and the query particle graph is a lattice representing alternate sequential groupings of sound sequences in the spoken query.

9. The method of claim 1, in which the set of particles represent all possible sound sequences that can occur in any query.

10. The method of claim 1, in which the set of particles is derived from a pronunciation of any sequence of words from the document.

11. The method of claim 1, in which the set of particles identifies the key in any document that the document from other documents.

12. The method of claim 1, in which the document particle graph and the query particle graph are normalized by a spelling-to-pronunciation mechanism.

13. The method of claim 1, in which the particles in the set of particles are acoustically distinct and self-contained.

14. The method of claim 1, in which a predictability of the occurrence of particles must be high.

15. The method of claim 1, in which each particle has a distinctive acoustic structure that distinguish the particle from all other particles, and has a relatively low acoustic variability between different instances of the same particle.

16. The method of claim 1, in which a predictability of an occurrence of a particular particle is relatively high.

17. The method of claim 1, in which the particle set is determined manually.

18. The method of claim 1, in which the particle set is determined heuristically.

19. The method of claim 1, in which each word in each document is first converted to a phonetic graph that represents all the possible pronunciations of the word, and then converting the phonetic graph to the document particle set.

20. The method of claim 1, further comprising:
    rank ordering the relevant documents.

21. An information retrieval system, comprising:
    means for constructing a set of particles and a simultaneously optimized particle-based language model using training documents, and in which a perplexity of the particle-based language model is at least ten times lower than the perplexity of a word-based language model constructed from the same training documents, wherein the set of particles applies expectation maximization to an objective function, and where the objective function considers any combination of:
    a size of the set of particles;
    errors in representing all documents in a document training set and a query training set;
    a retrieval accuracy of using the set of particles;

an entropy of a statistical models that represent the set of particles; and a particle-level language model derived from the documents and the queries in the training sets;

means for converting each document in a collection of documents to a document particle graph, the document graph, the document graph including particles selected from a set of the particles;

means for extracting, for each document, a set of document keys from the corresponding particle graph;

means for storing the document keys for each document in an index to a database storing the collection of documents;

means for converting a query to query particle graph including a set of query particles, the query graph including particles selected from the set of the particles;

means for extracting a set of query keys from the query particle graph;

means for retrieving relevant documents from the database according to the query keys and the document keys stored in the index; and means for outputting the relevant documents to a user.

* * * * *